United States Patent
Mao et al.

(10) Patent No.: US 11,054,503 B2
(45) Date of Patent: Jul. 6, 2021

(54) RADAR TARGET SPHERICAL PROJECTION METHOD FOR MARITIME FORMATION

(71) Applicant: THE 28th RESEARCH INSTITUTE OF CHINA ELECTRONICS TECHNOLOGY GROUP CORPORATION, Nanjing (CN)

(72) Inventors: Yi Mao, Nanjing (CN); Yunru Li, Nanjing (CN); Ping Chen, Nanjing (CN); Guan Wang, Nanjing (CN); Daqing Huang, Nanjing (CN); Bo Wang, Nanjing (CN)

(73) Assignee: THE 28TH RESEARCH INSTITUTE OF CHINA ELECTRONICS TECHNOLOGY GROUP CORPORATION, Nanjing (CN)

( * ) Notice: Subject to any disclaimer, the term of this patent is extended or adjusted under 35 U.S.C. 154(b) by 50 days.

(21) Appl. No.: 16/605,077

(22) PCT Filed: Sep. 16, 2019

(86) PCT No.: PCT/CN2019/105868
§ 371 (c)(1),
(2) Date: Oct. 14, 2019

(87) PCT Pub. No.: WO2020/057453
PCT Pub. Date: Mar. 26, 2020

(65) Prior Publication Data
US 2020/0309907 A1  Oct. 1, 2020

(30) Foreign Application Priority Data
Sep. 17, 2018  (CN) .......................... 201811079124.8

(51) Int. Cl.
*G01S 7/41* (2006.01)

(52) U.S. Cl.
CPC ..................... *G01S 7/41* (2013.01)

(58) Field of Classification Search
CPC . G01S 7/41; G01S 13/87; G01S 7/003; G01S 7/2955; G01S 13/726
(Continued)

(56) References Cited

U.S. PATENT DOCUMENTS

| 4,899,161 | A | * | 2/1990 | Morin, Jr. | ............. | G01S 7/2955 |
|   |   |   |   |   |   | 342/180 |
| 5,546,087 | A | * | 8/1996 | Martin Neira | ........ | G01S 13/003 |
|   |   |   |   |   |   | 342/120 |

(Continued)

OTHER PUBLICATIONS

Bryne, FT Norman, HL Pennett, LA, • Bryne, FT Norman, HL Pennett, "Positional Coordinate Conversion" LA, IBM TDB Archive, Apr. 1, 1995. (Year: 1995).*

(Continued)

*Primary Examiner* — Vladimir Magloire
*Assistant Examiner* — Alexander L. Syrkin
(74) *Attorney, Agent, or Firm* — CBM Patent Consulting, LLC (57) ABSTRACT

The present invention discloses a radar target spherical projection method for maritime formation. The method comprises the steps of converting the height of a radar target into an altitude and converting the position of the radar target into a spherical position, can be used for pre-processing radar data, supports multi-platform composite tracking based on a data chain, and contribute to generating a sharable single integrated picture (SIP) among formation members. The present invention can be widely applied to oceanic area formation operations such as coastguard patrol, sea escort, deep sea far sighting and maritime formation fight.

3 Claims, 3 Drawing Sheets

(58) Field of Classification Search
USPC .......................................................... 342/90
See application file for complete search history.

(56) References Cited

U.S. PATENT DOCUMENTS

| | | | |
|---|---|---|---|
| 2003/0169945 A1* | 9/2003 | Stanek | G01S 3/7865 |
| | | | 382/293 |
| 2011/0023132 A1* | 1/2011 | Jelavic | G06Q 50/26 |
| | | | 726/30 |
| 2017/0067990 A1* | 3/2017 | Reed | G01S 17/50 |

OTHER PUBLICATIONS

F. Totir, E. Radoi and A. Quinquis, "Validation of complex naval target models using superresolution imagery methods," Europe Oceans 2005, Brest, France, 2005, pp. 50-55 vol. 1, doi: 10.1109/OCEANSE. 2005. 1511683 (Year: 2005).*

L. Baiping and L. Dan, "Research and Realization of Coordinate Conversion in Radar Video Display," 2013 Ninth International Conference on Computational Intelligence and Security, Leshan, 2013, pp. 277-279, doi: 10.1109/CIS.2013.65. (Year: 2013).*

G. Hector, "Neurovision®; The way to merge visual reality with navigational and military systems," 2013 IEEE/AIAA 32nd Digital Avionics Systems Conference (DASC), East Syracuse, NY, 2013, pp. 3D5-1-3D5-12, doi: 10.1109/DASC.2013.6712571. (Year: 2013).*

S. Omar and S. Winberg, "Multisensor data fusion: Target tracking with a doppler radar and an Electro-Optic camera," 2011 IEEE International Conference on Control System, Computing and Engineering, Penang, 2011, pp. 210-215, doi: 10.1109/ICCSCE.2011.6190524. (Year: 2011).*

Bryne, FT Norman, HL Pennett, "Positional Coordinate Conversion" LA, IBM TDB Archive, Apr. 1, 1995. (Year: 1995).*

L. Yu, Z. Can-bin, F. Xin-xi and L. Bin-bin, "Estimation of aircraft altitude in 2D radar intelligence networking," 2010 2nd International Conference on Signal Processing Systems, Dalian, 2010, pp. V2-331-V2-333, doi: 10.1109/ICSPS.2010.5555467. (Year: 2010).*

J. Zhu, "Conversion of Earth-centered Earth-fixed coordinates to geodetic coordinates," in IEEE Transactions on Aerospace and Electronic Systems, vol. 30, No. 3, pp. 957-961, Jul. 1994, doi: 10.1109/7.303772. (Year: 1994).*

Li Duan, Xin-han Huang, Bin Luo and Qi-yuan Li, "Target tracking with interactive multiple model in geodetic coordinate system for naval ships cooperative engagement," 2008 11th International Conference on Information Fusion, Cologne, 2008, pp. 1-8. (Year: 2008).*

* cited by examiner

RADAR TARGET SPHERICAL PROJECTION METHOD FOR MARITIME FORMATION

TECHNICAL FIELD

The present invention relates to a radar target spherical projection method for maritime formation and belongs to the field of radar target surveillance.

TECHNOLOGY BACKGROUND

The rapid development and wide application of information technology has promoted the continuous innovation of a surveillance perception theory. The network center architecture is an inevitable product of the information age. The nature of the network center architecture is based on the situation picture as the center for the task planning and distribution of a formation platform.

Situation sharing of maritime formation is based on data link networking. Each platform uses target perception, edge computing, exchange service and other composite tracking processing to realize that all members in the formation share a precise integrated picture (SIP-Single Integrated Picture) for loading control and supporting collaborative operation.

The composite tracking is carried out among a plurality of sensor platforms. Real-time information such as a uniform identification number, a geographic position, an altitude, a true speed vector and target attributes of targets is determined through real-time exchange and correlation calculation of radar targets according to report responsibilities. The various platforms naturally form a consistent target track which is not lost, repetitive or chaotic. In order to make the target track accuracy meet the requirement of real-time collaborative control, edge computing must first carry out projection transformation on the radar target of the platform to reduce the impact of target parameter errors on the composite tracking system.

The existing radar data processing of maritime formation has not adopted edge computing method to realize the unification and sharing of distributed target situation. The existing multi-radar track fusion uses centralized processing, the system error correction uses sensor position calibration or real-time calibration methods, which lacks considering the projection error correction problem by the earth curvature, the single-platform radar data processing, as the projection error correction does not affect the continuity of target track tracking, it also lacks consideration of projection errors correction.

SUMMARY OF THE INVENTION

The present invention generates a single integrated picture for maritime formation, and provides a radar target spherical projection method for maritime formation. Each sensor platform performs projection error correction on a radar target before performing composite tracking processing on the target, converts the target height measured by a local radar into altitude, and converts the target polar coordinate positions into the ground (spherical) positions. Therefore, the target data detected by platforms at different positions on the sea are all based on the spherical surface, ensuring that distributed processing of radar points in composite tracking will not increase new accuracy loss.

The present invention specifically includes the following steps:

step 1, performing target projection modeling;
step 2, calculating the altitude of the target;
step 3, calculating the projection of the target on a radar plane;
step 4, calculating the projection of the target on the earth spherical surface; and
step 5, using the projection of the target on the earth spherical surface for radar data pre-processing, so as to generate a single integrated picture (SIP) which is widely used for oceanic area formation operations such as coastguard patrol, sea escort, deep sea far sighting and maritime formation fight.

The step 1 comprises the specific process as follows: expressing the target position detected by the radar through polar coordinates $(\rho, \alpha, \theta)$ with the position of a radar antenna as an original point, wherein $\rho$ is the target slant distance, $\alpha$ is the target azimuth relative to due north and $\theta$ is the target elevation; converting $(\rho, \alpha, \theta)$ into rectangular coordinates $(x_\rho, y_\rho, h)$ as follows:

$$\begin{cases} x_\rho = \rho \sin\alpha \\ y_\rho = \rho \cos\alpha \\ h = \rho \sin\theta \end{cases}$$

wherein $x_\rho$ represents an x-coordinate of the target, $y_\rho$ represents a y-coordinate of the target, and h represents a vertical coordinate of the target; and establishing a plane projection model and a spherical projection model of the target, wherein
the target plane projection model is as follows:

$$D/\rho = \sqrt{1 - \frac{h^2}{\rho^2}}$$

the spherical projection model is as follows: $(Z+R)^2 = D^2 + [(a+R+h)]^2$ in the formulas, D represents the projection length of p on the radar plane, Z represents the altitude of the target, R represents the earth radius (6371.3 km), and a represents the altitude of the radar antenna.

The step 2 comprises the specific process as follows:
substituting $D = \rho \cos\theta$, $h = \rho \sin\theta$ into the spherical projection model of the target, obtain
$Z(Z+2R) = 2(a+R)\rho \sin\theta + a(a+2R) + \rho^2$, namely, $$\frac{Z(Z+2R)}{2a+2R} = \frac{(2a+2R)\rho\sin\theta}{2a+2R} + \frac{a(a+2R)}{2a+2R} + \frac{\rho^2}{2a+2R},$$

converting the above formula into the following formula as $R \gg a$, $R \gg Z$, $$Z = h + a + \frac{\rho^2}{2(a+R)} \quad (1)$$

The step 3 comprises the specific process as follows:

setting $\sqrt{1 - \frac{h^2}{\rho^2}} = K_1,$ regarding $K_1$ as a plane projection coefficient, so that the plane projection model of the target is converted into the following formula:

$$D=K_1 \cdot \rho \quad (2)$$

obtaining projection coordinates of the target on the radar plane according to the principle of the same proportion of sides of similar figures, $$\begin{cases} x = K_1 \cdot x_\rho = K_1 \cdot \rho \sin\alpha \\ y = K_1 \cdot y_\rho = K_1 \cdot \rho \cos\alpha \end{cases}$$

wherein x represents the x-coordinate of the target's projection on the radar plane, and y represents the y-coordinate of the target's projection on the radar plane.

The step 4 comprises the specific process as follows:

step 4-1, $$\text{setting } d = 2R \cdot \tan\frac{\beta}{2}$$

wherein β represents a central angle formed by a target projection point Q on the spherical surface and a radar position point $$S, \frac{\beta}{2}$$

is an angle or circumference, a is the side length of the part, tangent to the position of the radar, of the opposite side of $$\frac{\beta}{2},$$

and supposing that a point P exists, the side length is $\overline{SP}=d$;

$$\text{as } \sin\beta = \frac{D}{R+Z}, \cos\beta = \frac{h+\alpha+R}{R+Z}, \text{ and}$$

$$\tan\frac{\beta}{2} = \frac{\sin\beta}{1+\cos\beta},$$

$$d = \frac{2R}{2R+Z+h+\alpha};$$

step 4-2, substituting h in the above formula through the formula (1), obtain $$d = \frac{R}{R+Z-\frac{\rho^2}{4(\alpha+R)}} \cdot D;$$

step 4-3, $$\frac{R}{R+Z-\frac{\rho^2}{4(\alpha+R)}} = K_2,$$

regarding $K_2$ as a spherical projection coefficient, so that $$d=K_2 \cdot D,$$

substituting the formula (2) into the above formula, obtain $$d=K_1 \cdot K_2 \cdot \rho \quad (3);$$

step 4-4, approximately substituting a projection point of the target on the spherical surface with the point P, and obtaining coordinates $P(X_Q, Y_Q)$ of the spherical projection point of the target according to the principle of the same proportion of sides of similar figures, namely:

$$\begin{cases} X_Q = K_1 \cdot K_2 \cdot x_\rho \\ Y_Q = K_1 \cdot K_2 \cdot y_\rho \end{cases}$$

wherein $X_Q$ represents an East coordinate of the projection of the target on the spherical surface, and $Y_Q$ represents a North coordinate of the projection of the target on the spherical surface;

so, calculation formulas of the spherical projection coordinates and the altitude of the radar target are as follows:

$$\begin{cases} X_Q = K_1 \cdot K_2 \cdot \rho\sin\alpha \\ Y_Q = K_1 \cdot K_2 \cdot \rho\cos\alpha \\ Z = h+a+\frac{\rho^2}{2(R+a)} \end{cases}$$

The step 5 comprises the specific process as follows:

The calculation formulas of the spherical projection coordinates and the altitude of the radar target are used for preprocessing of radar data. It is to correct the projection error of radar target data and to solve the problem of spatial consistency of target data among multiple platforms in formation, then, to enter composite tracking processing which, generates a single integrated picture for supporting load control of a local platform or collaborative control over formation.

The present invention helps to generate a shareable single integrated picture (SIP) among formation members. The important function of SIP is to support remote data control, that is, load control over the local platform is performed by radar observation of the other platform. Overcome the visual range limitation of target tracking by the sensors of local platform and solve the problem of insufficient surveillance range of a single platform on the sea. Therefore, target accuracy of composite tracking needs to achieve the real-time control level, which requires to perform projection error correction on target data firstly when radar data is processed. It reduces the positioning errors of the radar target and the radar coordinate conversion error among the multiple platforms.

The present invention has the main advantages as follows:

(1) a mathematical algorithm that target measurement parameters based on a radar polar coordinate system are converted into the spherical position and the altitude through projection modeling and mathematical derivation facilitates engineering application;

(2) the positioning precision of the radar target can be effectively improved, and the radar coordinate conversion error among the multiple platforms can be effectively reduced;

(3) the multiple sensor platforms with the network as the center can achieve spatial unification, and the composite tracking precision of the target is improved.

BRIEF DESCRIPTION OF THE DRAWINGS

The present invention is further explained in detail with drawings and specific modes of execution, and the mentioned advantages of the present invention or the advantages in other aspects will be much clearer.

DETAILED DESCRIPTION OF THE INVENTION

The present invention is further explained in combination with drawings and the embodiment.

1. Projection Modeling

A radar generally regards the position of an antenna as an original point, polar coordinates ($\rho$, $\alpha$, $\theta$) represent the position of a detected target, $\rho$ is the target slant distance, $\alpha$ is the target azimuth relative to due north and $\theta$ is the target elevation. The polar coordinates ($\rho$, $\alpha$, $\theta$) are converted into rectangular coordinates as follows:

$$\begin{cases} x_\rho = \rho\sin\alpha \\ y_\rho = \rho\cos\alpha \\ h = \rho\sin\theta \end{cases}$$

Due to influence of the earth curvature and a certain height of the radar antenna, h in the formula does not represent the real height of a target, ($x_\rho$, $y_\rho$) is far different from the projection position of the target on the ground. Influence caused by errors is large in actual application like verification of unknown targets and search and rescue. Therefore, in radar data distributed type processing, projection transformation needs to be performed on a target point trace firstly to obtain the projection position and the altitude of the target on the ground.

Figure 1:
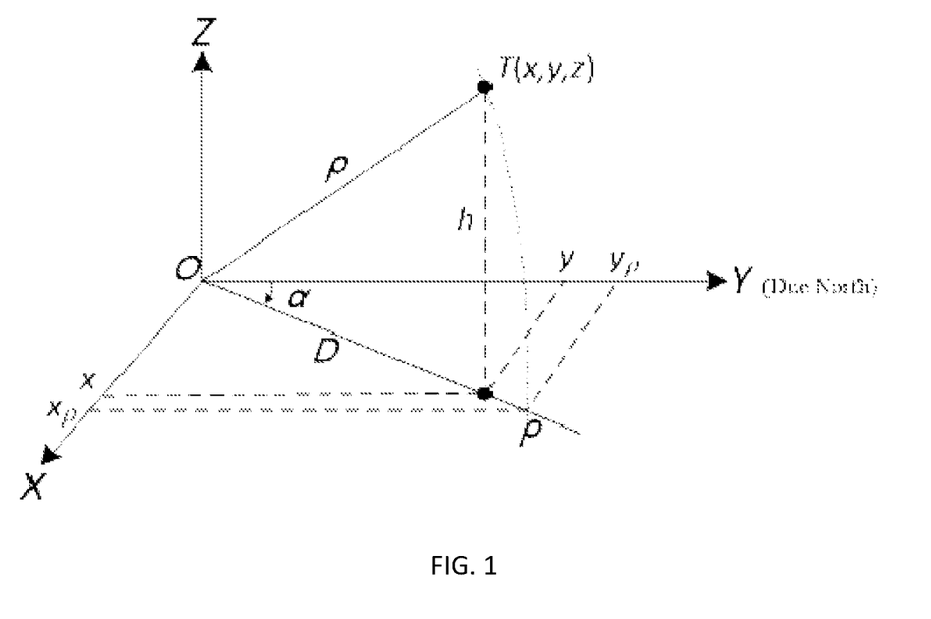
FIG. 1 is a target plane projection schematic diagram.
Figure 2:
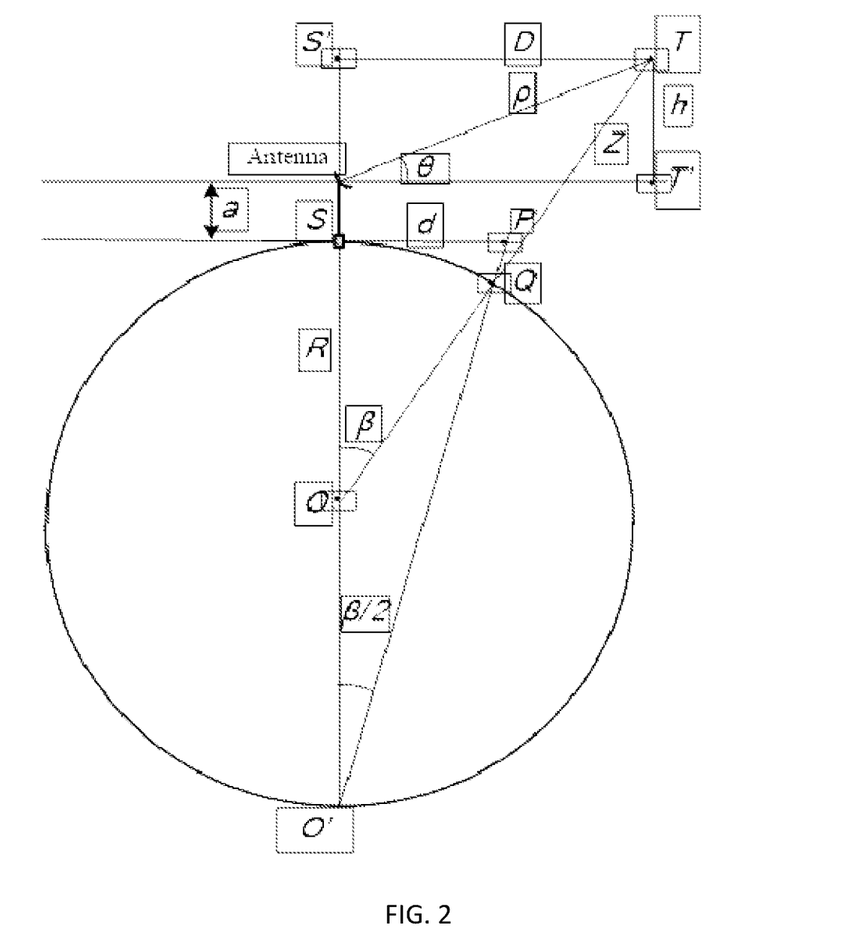
FIG. 2 is a target spherical projection schematic diagram.

In order to convert the coordinates of the radar target into the spherical projection coordinates, a plane projection model and a spherical projection model of the target are established, as shown in FIG. 1 and FIG. 2, wherein R represents the earth radius (6371.3 km), S represents the position of the radar, $\alpha$ represents the altitude of the radar antenna, and T represents the aerial target.

2. Calculation of Altitude of the Target

The relation between the altitude Z of the target and the measurement height h of the radar can be deduced according to FIG. 2.

Through $\Delta OS'T$, the spherical projection model of the target can be expressed into:

$(Z+R)^2 = D^2 + [(\alpha+R+h)]^2$ $D = \rho \cos\theta$, $h = \rho \sin\theta$ are substituted into the formula, obtain $Z(Z+2R) = 2(a+R)\rho\sin\theta + a(a+2R) + \rho^2$, namely, $$\frac{Z(Z+2R)}{2a+2R} = \frac{(2a+2R)\rho\sin\theta}{2a+2R} + \frac{a(a+2R)}{2a+2R} + \frac{\rho^2}{2a+2R}$$

The above formula can be converted into the following formula as R>>a, R>>Z, $$Z = h + a + \frac{\rho^2}{2(a+R)} \tag{1}$$

3. Calculation of Projection of the Target on a Radar Plane

The target is projected onto the radar plane, and the projection relation is shown as FIG. 1.

The plane projection model of the target is expressed as $$D^2 = \rho^2 - h^2, \text{ namely } D/\rho = \sqrt{1-\frac{h^2}{\rho^2}}$$

$$\sqrt{1-\frac{h^2}{\rho^2}} = K_1$$

is set and regarded as a plane projection coefficient, so $$D = K_1 \cdot \rho \tag{2}$$

According to the principle of the same proportion of sides of similar figures, the projection coordinates of the target on the radar plane can be obtained as follows:

$$\begin{cases} x = K_1 \cdot x_\rho = K_1 \cdot \rho\sin\alpha \\ y = K_1 \cdot y_\rho = K_1 \cdot \rho\cos\alpha \end{cases}$$

4. Calculation of Projection of the Target on the Earth Spherical Surface

The projection of the target T on the ground is a point Q, and is approximately substituted with the point P according to FIG. 2.

Through $\Delta O'SP$, it is known that $$d = 2R \cdot \tan\frac{\beta}{2}$$

As $\sin\beta = \frac{D}{R+Z}$, $\cos\beta = \frac{h+a+R}{R+Z}$, and $$\tan\frac{\beta}{2} = \frac{\sin\beta}{1+\cos\beta},$$

$$d = \frac{2RD}{2R+Z+h+a}$$

h in the above formula is substituted with the formula (1), obtain $$d = \frac{R}{R + Z - \frac{\rho^2}{4(a+R)}} \cdot D$$

$$\frac{R}{R + Z - \frac{\rho^2}{4(\alpha + R)}} = K_2$$

is set and regarded as a spherical projection coefficient, so $$d = K_2 \cdot D$$

The formula (2) is substituted into the above formula, so $$d = K_1 \cdot K_2 \cdot \rho \quad (3)$$

$P(X_Q, Y_Q)$ can be obtained according to the principle of the same proportion of sides of similar figures as well, namely $$\begin{cases} X_Q = K_1 \cdot K_2 \cdot x_\rho \\ Y_Q = K_1 \cdot K_2 \cdot y_\rho \end{cases}$$

Figure 3:
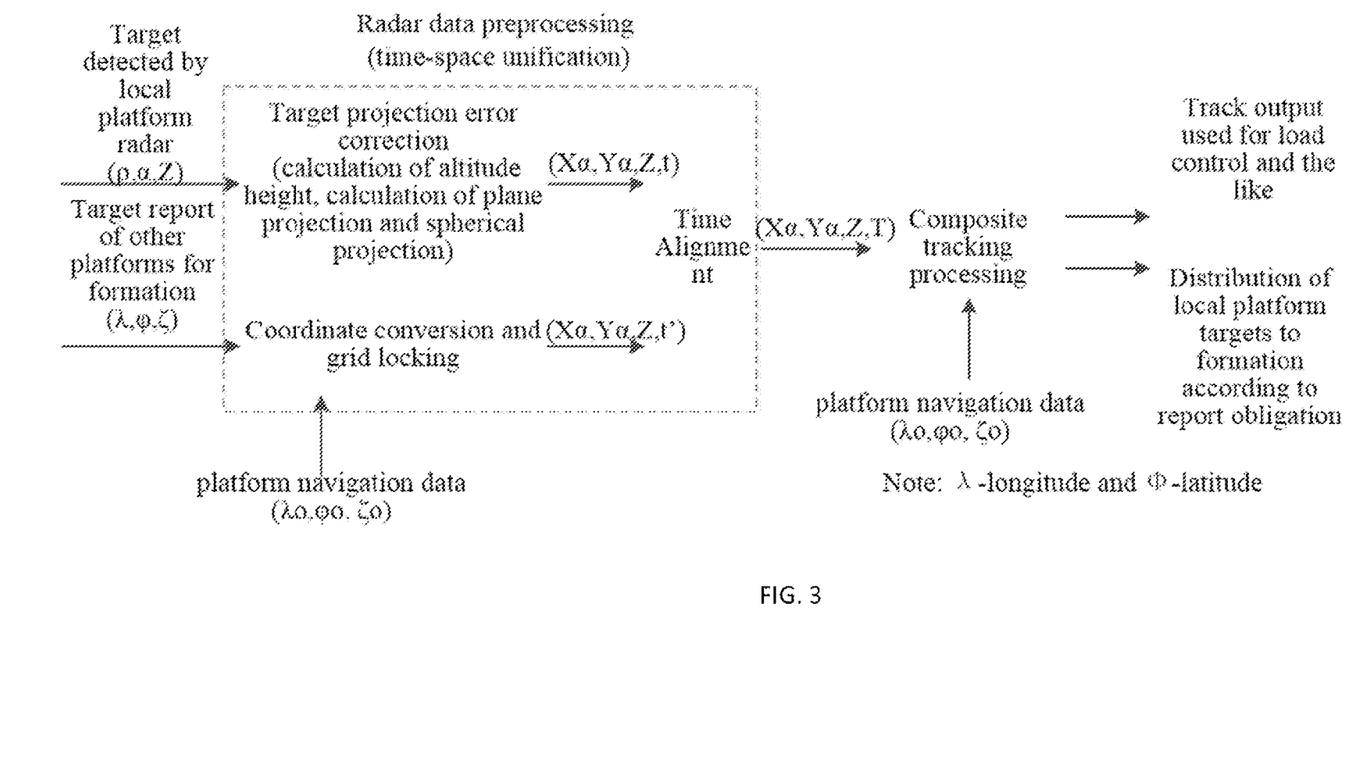
FIG. 3 is a brief flow chart of radar data distributed type processing for maritime formation.

In conclusion, the algorithms of the spherical projection coordinates and the altitude of the radar target are as follows:

$$\begin{cases} X_Q = K_1 \cdot K_2 \cdot \rho \sin\alpha \\ Y_Q = K_1 \cdot K_2 \cdot \rho \cos\alpha \\ Z = h + a + \frac{\rho^2}{2(R+a)} \end{cases} \quad (4)$$

wherein, $$K_1 = \sqrt{1 - h^2/\rho^2}$$
$$K_2 = \frac{R}{R + Z - \rho^2/[4(a+R)]}$$
$$h = \rho \sin\theta$$

ρ—the target slant distance of the radar
α—the target azimuth of the radar
θ—the target elevation of the radar
a—the altitude of the position of the radar antenna
R—the earth radius 5. Application of a Radar Target Spherical Projection Method to Pre-Processing of Radar Data and to Generate a Picture The brief flow of radar data distributed type processing for maritime formation is shown as FIG. 3. Each platform that undertakes the task of a target surveillance task executes the same flow. Pre-processing of radar data mainly includes space-time consistency for multi-platform target data for formation. The projection error correction is achieved through calculation of the altitude, plane projection and spherical projection on the target data of the local radar. A far-end target report is subjected to coordinate conversion and accurate grid locking, to reach space unification of the local target data and the far-end target data. The local target data and the far-end target data are subjected to time alignment processing to achieve time unification. Then entering composite tracking processing that includes target correlation, fusion, smoothing, prediction, identification number consistency management and report obligation processing which generates the single integrated picture (SIP) for supporting load control over a local platform or collaborative control over formation.

The present invention provides a radar target spherical projection method for maritime formation, there are many specific methods and ways for achieving the present technical scheme, and the above-mentioned is only a preferred mode of execution of the present invention. It should be noted that for general technicians in the technical field, various improvements and retouches may be made therein without departing from the principle of the present invention and should be regarded within the protection scope of the present invention. Components not specifically identified in the present embodiment may be implemented in accordance with the prior art.

What is claimed is:

1. A radar target spherical projection method for generating and using a single integrated picture (SIP) in a maritime formation comprising executing following steps:
step 1, performing a projection modeling of a target at each of a plurality of platforms;
step 2, calculating in the each platform an altitude of the target wherein the calculating comprises a specific process as follows:
substituting D=ρ cos θ, h=ρ sin θ into a spherical projection model of the target, to obtain:

$$Z(Z+2R) = 2(a+R)\rho \sin\theta + a(a+2R) + \rho^2, \text{ namely,}$$

$$\frac{Z(Z+2R)}{2a+2R} = \frac{(2a+2R)\rho\sin\theta}{2a+2R} + \frac{a(a+2R)}{2a+2R} + \frac{\rho^2}{2a+2R}$$

converting the above formula as R>>a, R>>Z, to obtain an altitude calculation formula of the target as follows:

$$Z = h + a + \frac{\rho^2}{2(a+R)} \quad \text{(formula 1)}$$

step 3, calculating a projection of the target on a radar plane in the each platform;
step 4, calculating the projection of the target on an earth spherical surface in the each platform which comprises a specific process as follows:
step 4-1, setting $$d = 2R \cdot \tan\frac{\beta}{2}$$

wherein β represents a central angle formed by a target projection point Q on the earth spherical surface and a radar position at a point $$S, \frac{\beta}{2}$$

is an angle of circumference, d is a side length of a part, tangent to the radar position, of an opposite side of $$\frac{\beta}{2},$$

and supposing that a point P exists, the side length is $\overline{SP}=d$;

as $\sin\beta = \dfrac{D}{R+Z}$, $\cos\beta = \dfrac{h+a+R}{R+Z}$, and $\tan\dfrac{\beta}{2} = \dfrac{\sin\beta}{1+\cos\beta}$, $$d = \frac{2RD}{2R+Z+h+a};$$

step 4-2, substituting h in d=2RD/2R+Z+h+a in the step 4-1 through the (formula 1), to obtain:

$$d = \frac{R}{R+Z - \dfrac{\rho^2}{4(a+R)}} \cdot D;$$

step 4-3, setting $$\frac{R}{R+Z - \dfrac{\rho^2}{4(a+R)}} = K_2,$$

regarding $K_2$ as a spherical projection coefficient, so that $d = K_2 \cdot D$, substituting D in $d = K_2 \cdot D$ above from $D = K_1 \cdot \rho$      (formula 2), to obtain $d = K_1 \cdot K_2 \cdot \rho$      (formula 3);

step 4-4, approximately substituting a projection point of the target on the earth spherical surface with the point P, and obtaining coordinates $P(X_Q, Y_Q)$ of the spherical projection of the target according to a principle of a same proportion of sides of similar figures, namely:

$$\begin{cases} X_Q = K_1 \cdot K_2 \cdot x_\rho \\ Y_Q = K_1 \cdot K_2 \cdot y_\rho \end{cases}$$

wherein $X_Q$ represents an East coordinate of the projection of the target on the earth spherical surface, and $Y_Q$ represents a North coordinate of the projection of the target on the earth spherical surface;

so, calculation formulas of spherical projection coordinates and the altitude of the radar target are as follows:

$$\begin{cases} X_Q = K_1 \cdot K_2 \cdot \rho \sin\alpha \\ Y_Q = K_1 \cdot K_2 \cdot \rho \cos\alpha \\ Z = h + a + \dfrac{\rho^2}{2(R+a)} \end{cases}$$

step 5, collecting obtained projections of the target on the earth spherical surface from multiple platforms for preprocessing radar data and generating a picture; and step 6, processing radar data including data of space-time consistency of the target from the multiple platforms, correcting projection errors by calculating data on the altitude, the projection on the earth spherical surface of the target from the multiple platforms, generating the single integrated picture (SIP), and using the SIP for supporting a load control of the platform or a collaborative control over the maritime formation.

2. The method according to claim 1, characterized in that the step 1 comprises a specific process as follows:

expressing a position of the target detected by a radar through polar coordinates ($\rho, \alpha, \theta$) with a position of a radar antenna as an origin point, wherein specifically, $\rho$ is a slant distance to the target, a is an azimuth of the target relative to due north and $\theta$ is an elevation of the target;

converting ($\rho, \alpha, \theta$) into rectangular coordinates ($x_\rho, y_\rho, h$) as follows:

$$\begin{cases} x_\rho = \rho \sin \cdot \alpha \\ y_\rho = \rho \cos \cdot \alpha \\ h = \rho \sin \cdot \theta \end{cases}$$

wherein $x_\rho$ represents an x-coordinate of the target, $y_\rho$ represents a y-coordinate of the target, and represents a vertical coordinate of the target; and establishing a plane projection model and a spherical projection model of the target, wherein the plane projection model of the target is as follows:

$$D/\rho = \sqrt{1 - \frac{h^2}{\rho^2}}$$

the spherical projection model of the target is as follows:

$(R+Z)^2 = D^2 + [(a+R+h)]^2$ in formulas, D represents a length of a projection of $\rho$ on the radar plane, Z represents the altitude of the target, R represents the earth radius, and a represents an altitude of the position of the radar antenna.

3. The method according to claim 1, characterized in that the step 3 comprises a specific process as follows:

Setting $$\sqrt{1 - \frac{h^2}{\rho^2}} = K_1,$$

regarding $K_1$ as a plane projection coefficient, so that a plane projection model of the target is converted into the (formula 2):

$D = K_1 \cdot \rho$ obtaining projection coordinates of the target on the radar plane according to a principle of a same proportion of sides of similar figures, $$\begin{cases} x = K_1 \cdot x_\rho = K_1 \cdot \rho \sin\alpha \\ y = K_1 \cdot y_\rho = K_1 \cdot \rho \cos\alpha \end{cases}$$

wherein x represents an x-coordinate of the projection of the target on the radar plane, and y represents a y-coordinate of the projection of the target on the radar plane.

* * * * *